United States Patent Office 3,740,369
Patented June 19, 1973

3,740,369
LOW VISCOSITY SOLUTION OF FLUOROPOLYMER DUE TO THE USE OF POLAR ORGANIC COMPOUNDS
Stephen Proskow, Wilmington, Del., assignor to E. I. du Pont de Nemours and Company, Wilmington, Del.
No Drawing. Continuation-in-part of application Ser. No. 727,724, May 8, 1968, which is a continuation-in-part of application Ser. No. 577,810, Sept. 8, 1966, both now abandoned. This application June 25, 1971, Ser. No. 156,991
Int. Cl. C08f 45/42, 45/58, 45/60
U.S. Cl. 260—30.4 R                 10 Claims

ABSTRACT OF THE DISCLOSURE

A fluoropolymer solution composition having a lower than expected viscosity is obtained by mixing together certain proportions of a copolymer of tetrafluoroethylene and a perfluoroalkyl perfluorovinyl ether, a suitable fluorinated solvent, and a polar organic compound whose melting point is below 75° C. and whose molecular weight is below 400.

CROSS-REFERENCE TO RELATED APPLICATIONS

This application is a continuation-in-part of U.S. patent application Ser. No. 727,724, filed May 8, 1968; the latter was a continuation-in-part of U.S. patent application Ser. No. 577,810, filed Sept. 8, 1966 (both of these applications have been abandoned).

BACKGROUND OF THE INVENTION

This invention relates to a fluoropolymer solution composition wherein the fluoropolymer is a copolymer of tetrafluoroethylene and a perfluoroalkyl perfluorovinyl ether.

There is a need in the art for a fluoropolymer solution composition made from a copolymer of the type mentioned above which has a lower viscosity at a given polymer content than solution compositions of this copolymer provided by the prior art. Such a composition is needed whose viscosity is low enough so that one can readily achieve good control of film thickness and good wetting of the substrate when using the composition to prepare films, coatings, adhesive layers, and the like. It would be especially desirable to obtain such a composition having not only a relatively low viscosity, but also a polymer content high enough so that there is no need for excessive amounts of organic solvents or diluents, very long drying periods, or an unreasonable number of coats to obtain the desired film thickness.

SUMMARY OF THE INVENTION

Expressed broadly, the present invention provides a composition which comprises the following components:

(A) about 0.1–30% of a copolymer of tetrafluoroethylene and a perfluoroalkyl perfluorovinyl ether, said ether having the formula $C_nF_{2n+1}$—O—CF=CF$_2$ wherein $n$ is a number of 1–5, said copolymer containing at least 30 mole percent of units from said ether, (B) about 68–99.8% of a solvent for component (A) selected from the group:
   (B–1) mixed isomers of perfluoro cyclic ethers of the empirical formula $C_8F_{16}O$,
   (B–2) non-cyclic fluorinated polyethers of the structure

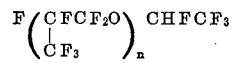

wherein $n$ is a number of 1–5, and
   (B–3) dichlorooctafluorobutane, and
(C) about 0.1–3% of a viscosity-depressing polar organic compound having a melting point below 75° C., and having a molecular weight below 400;

said percentage values being percent by weight based on the combined weight of components (A), (B), and (C).

DESCRIPTION OF PREFERRED EMBODIMENTS

A component (A) copolymer content of at least 2% [based on the total weight of components (A), (B), and (C)] is preferred in many applications of the composition, with special preference for a copolymer content of about 5–30%.

In many cases, it is preferred that the novel composition contains a component (A) copolymer wherein said ether is perfluoromethyl perfluorovinyl ether. Useful results can also be obtained when the perfluoromethyl group of the ether is replaced with a $C_2$–$C_5$ perfluoroalkyl group. It is also preferred in many applications of the invention to use a component (A) copolymer which is an elastomer having a tetrafluoroethylene/ether molar ratio of about 50:50 to 70:30.

The component (A) type of copolymer is known in the art. For example, polymers of this type and methods of preparing them are described in U.S. Pat. 3,132,123 issued May 5, 1964, to Harris and McCane, and in Canadian Pat. 894,898, which is equivalent to U.S. patent application Ser. No. 12,345, filed on Feb. 18, 1970, by G. A. Gallagher. The copolymer is a solid (non-liquid) under normal atmospheric conditions. The copolymer is preferably prepared by a free-radical polymerization in aqueous emulsion whereby the monomer units are randomly connected to each other to form chains of recurring monomer units.

One useful method of preparing the copolymer is as follows:

A solution of 13.8 grams of dibasic sodium phosphate (Na$_2$HPO$_4$·7H$_2$O), 15 grams of ammonium perfluorooctanoate, and 4 grams of ammonium persulfate

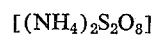

in 1886 ml. of water is put in a one-gallon stirred autoclave. After sealing the autoclave, the solution is heated to 50° C.; and a mixture of 40 mole percent of perfluoromethyl perfluorovinyl ether and 60 mole percent tetrafluoroethylene is introduced into the autoclave until a pressure of 140 p.s.i.g. is attained. While the monomer gases are being fed to the autoclave, 50 ml. of catalyst solution containing 1.0 gram of sodium sulfite and 20.0 mgm. of copper sulfate (CuSO$_4$·5H$_2$O) dissolved in water is added at 140 p.s.i.g. pressure. Over a period of five hours, the pressure is maintained at 140 p.s.i.g. by addition of a suitable amount of the 40:60 monomer mixture. During this time, a total of 60 ml. of catalyst solution containing 1.2 grams of sodium sulfite and 24 mgm. of copper sulfate is added in increments of 5 ml. The autoclave is vented, and 2744 grams of latex is obtained. Polymer weighing 665 grams is isolated from the latex by freeze coagulation, followed by water washing and oven drying the resulting elastomeric copolymer.

It is a preferred embodiment of the invention to use a component (A) copolymer which contains carboxylic acid end groups; such end groups are present in the copolymer as prepared by methods such as those described above. With this type of copolymer, a particularly striking reduction in the viscosity of solution is obtained when very small amounts of the component (C) polar organic compound is added. However, it is possible to treat the copolymer to remove carboxylic acid end groups. With the resulting copolymer, a lesser but still very worthwhile decrease in solution viscosity can be obtained when component (C) is added according to the present invention.

The solvent component (B) is present in the composition in the amount shown above in Summary of the Invention. Component (B) can be composed of any one of the specified fluorine-containing solvents (B-1), (B-2), and (B-3), or blends of two of more such solvents.

A typical (B-1) type of solvent is sold under the 3M Company trade name "FC-75," which has a boiling point of about 99-107° C., a pour point (ASTM D-97) of −62° C. maximum, and a density (ASTM D-941, grams/cc. at 25° C.) of 1.77±0.02; its properties are further described in the bulletin 3M Co. Technical Inf. Y-IFLFC (49.15)M.

A typical (B-2) type of solvent wherein $n$ is 2 is sold under the Du Pont trade name "Freon" E-2, which has a molecular weight of 452.08 and a boiling point of 104.4° C. Useful (B-2) type solvents are further described in the Du Pont "Freon" Technical Bulletin EL-8B under the subject "Freon" E Series Fluorocarbons.

A typical (B-3) type of solvent is sold under the Halocarbon Products trade name "Halocarbon" 428. It is characterized by the empirical formula $C_4Cl_2F_8$; it is a liquid which has a molecular weight of 270.91, a boiling point at one atmosphere of 63° C., and a freezing point of −68° C.

Component (C) of the novel composition is a viscosity-depressing polar organic compound whose melting point is below 75° C., and whose molecular weight is below 400. Component (C) is "viscosity depressing" in the sense that it has the ability to cause a noticeable reduction in composition viscosity when added to a mixture of components (A) and (B) in an amount within the proportions specified in the above Summary of the Invention. Component (C) can be further characterized in various preferred embodiments of the invention as being composed of one or more of the following types of compounds: carboxylic acids, anhydrides, hydroxylic compounds, ethers, esters, aldehydes, ketones, amines, amides, nitriles, nitro compounds, sulfones, sulfoxides, phosphines, and phosphates. One skilled in the art, after reading the present disclosure (and in some cases possibly after one or two simple trial runs), will have little difficulty in selecting the type and proportion of component (C) that gives the desired viscosity reduction in a particular application of the invention.

In certain preferred embodiments of the composition, component (C) is soluble in component (B) when in combination with components (A) and (B) in an amount within the proportions specified. Such a composition usually has a clear rather than cloudy appearance, especially when only the three essential components [(A), (B), and (C)] are present.

Among the most useful component (C) polar compounds are trifluoroacetic acid, methanol, hexafluoroisopropanol (e.g. 1,1,1,3,3,3-hexafluoropropanol-2), and diethylene glycol dimethyl ether (also known as diglyme). Other useful compounds are illustrated as follows: triethylamine, diethylamine, n-butyl amine, pyridine, nitroalkyl compounds (e.g. nitroethane), aliphatic esters (e.g. ethyl acetate), aliphatic phosphines, hexafluoroacetone hydrate, dimethyl sulfoxide, tetrahydrofuran, acetic acid, and dimethylformamide.

The composition can also contain pigments, fillers, or other additives which are known to be useful in liquid polymeric film-forming compositions and which do not undergo any harmful reaction with the other ingredients.

The composition can be prepared by methods known to be useful for the manufacture of polymer solution film-forming compositions. For example, the components can be mixed together in a churn or other suitable mixer until a homogeneous solution composition is obtained. Or component (A) can be allowed to stand in contact with component (B) for about 1-2 days to form a jelly-like mass, followed by addition with mixing of the viscosity-depressing compound.

Fluoropolymer solution compositions based on the above-described copolymer are obtainable according to the present invention which have an unexpectedly low viscosity, even when the copolymer content of the composition is relatively high. This permits beneficial control of film thickness and wetting of substrates when the novel composition is employed in the manufacture of films, coatings, adhesive layers, and the like. In addition, the viscosity-reduction at a given preferred high polymer content makes it possible to achieve advantages such as these: to use economical film-forming methods which could not otherwise be used; to reduce the total cost of solvent used; to reduce total drying time; and to reduce the number of operations needed to obtain a given film thickness. It is surprising that these results are obtained by using such a small amount of component (C). The novel composition can be used to manufacture high quality films and coatings of the copolymer.

The following examples illustrate the invention. All amounts are by weight unless otherwise indicated.

Example 1

A low-viscosity fluoropolymer solution composition is prepared by (1) providing a component (A) copolymer as described above having a tetrafluoroethylene/perfluoromethyl perfluorovinyl ether molar ratio of 62:38, and containing carboxylic acid end groups; (2) mixing 15 grams of the copolymer with 354 grams of the component (B-1) type of solvent described above which is sold as "FC-75," thereby forming a clear gelatinous mass (gel) having a copolymer content of about 4.1%; (3) mixing with the resulting gel 0.77 gram of trifluoroacetic acid, thereby forming a mobile, easily-poured polymer solution.

The resulting solution composion has a Brookfield viscosity of 456 cps. (50 r.p.m. at 25° C.). This free-flowing composition, unlike the gel obtained in step 2, can easily be poured onto a glass plate or other suitable substrate in the preparation of cast films of the elastomeric copolymer.

When Example 1 is repeated except in step 2 the amount of solvent added is enough less so that the resulting gel has a copolymer content of 7.9%, a useful liquid film-forming composition is obtained whose Brookfield viscosity is 1490 cps. (50 r.p.m. at 25° C.).

Example 2

Another useful composition of the invention is prepared by repeating Example 1 except (a) the copolymer of step 1 has a tetrafluoroethylene/perfluoromethyl perfluorovinyl ether molar ratio of 65.8:34.2; (b) in step 2, ten grams of the copolymer are mixed with 90 grams of the component (B-2) type of solvent described above which is sold as "Freon" E-2 to form a gel whose copolymer content is 10%; and (c) in step 3, the gel is mixed with 0.5 gram of trifluoroacetic acid until a homogeneous fluid composition is obtained.

A useful fluid composition can also be obtained by repeating Example 2 except the (B-2) type of solvent is replaced with the component (B-3) type of solvent described above which is sold as "Halocarbon" 428.

Example 3

Another fluid composition is prepared by repeating Example 2 except the (B-2) type of solvent is replaced with the (B-1) solvent used in Example 1, and the trifluoroacetic acid is replaced with 0.8 gram of hexafluoroisopropanol.

A 15 mil thick layer of the fluid composition is spread on a glass plate. After rapid evaporation of the volatile components, a 1.5 mil thick film of the elastomeric copolymer is obtained. Only a single spreading and drying operation is needed to obtain the required 1.5 mil dry film thickness.

Example 4

A fluid composition having a copolymer content of about 15% is prepared by mixing 22.5 grams of the Example 2 copolymer with a mixture of 127.1 grams of the (B-1) solvent of Example 1 and 0.4 gram of trifluoroacetic acid. Mixing agitation (e.g. shaking) is continued until a homogeneous fluid composition is obtained. The composition has a Brookfield viscosity of 37,500 cps. (12 r.p.m. at 25° C., No. 4 spindle).

When a composition outside the invention is prepared by repeating Example 4 except the 0.4 gram of trifluoroacetic acid is omitted, and the composition is diluted with a large amount of the (B-1) solvent until the copolymer content of the composition is only 2%, the resulting gel-like composition has a viscosity greater than 100,000 cps. Thus, it is quite surprising that a viscosity of only 37,500 is achieved in the much more concentrated composition of Example 4 by adding only 0.4 gram of the component (C) compound (trifluoroacetic acid).

Example 5

A fluid composition having a copolymer content of 0.1% is prepared by mixing 0.1 gram of copolymer with 99 grams of the (B-3) solvent referred to above as "Halocarbon" 428 and 1 gram of methanol. The copolymer has a tetrafluoroethylene/perfluoromethyl perfluorovinyl ether molar ratio of 58.5:41.5. The resulting composition has an inherent viscosity of 0.26.

When a composition outside the invention is prepared by repeating Example 5 except the 1 gram of methanol is omitted, the composition has an inherent viscosity of 0.55. Thus, it will be noted that a considerably lower viscosity is achieved in Example 5 by adding only one gram of methanol even though the composition has a very low copolymer content.

Example 6

The copolymer of Example 2 is used. A gelatinous mass containing 2% of the copolymer in the (B-1) solvent of Example 1 is prepared by shaking the two materials together for 48 hours. To 10 grams of the mixture is added, with stirring, 1, 2, or 3 drops of the viscosity depressants shown in Table I. This corresponds to about 0.4%, 0.8%, or 1.2% by weight of the composition. The solutions are evaluated visually and rated according to the following standards:

+ Slightly effective at the 1.2% concentration
++ Flows freely at the 0.4% concentration
+++ Very large effect, solution is very thin at the 0.4% concentration
C Denotes the solution is cloudy

TABLE I

| Viscosity depressant: | Rating |
|---|---|
| Tetrahydrothiophene | + |
| Diethyl ether | + |
| Nitrobenzene | +C |
| Paraldehyde | ++ |
| Ethyl acetate | ++ |
| Dimethyl sulfoxide | ++C |
| Benzaldehyde | ++C |
| Phenol | ++C |
| Nitromethane | ++ |
| Tricresylphosphate | ++C |
| Tetramethylene sulfone | ++C |
| Diethylamine | +++ |
| Acetonitrile | +++ |
| Dimethylformamide | +++C |
| Triethylamine | +++ |
| Diethylene glycol dimethyl ether | +++ |
| Tributylphosphine | +++C |
| Pyridine | +++ |
| 5-norbornene-2-methanol | +++C |
| Nitroethane | +++ |
| n-Butylamine | +++ |
| Acetic anhydride | +++ |
| Methanol | +++ |

Example 7

The copolymer of Example 2 is heated at 316° C. to remove residual volatiles, and then used to make a solution consisting of 25 parts of copolymer, 73 parts of the (B-1) solvent of Example 1, and two parts of triethyl amine. The solution is made by shaking the components together in a closed bottle for three days at room temperature, and then holding the mixture another three days without shaking. The solution is readily pourable and has a smooth consistency.

I claim:
1. A composition which comprises
    (A) about 0.1-30% of a copolymer of tetrafluoroethylene and a perfluoroalkyl perfluorovinyl ether, said ether having the formula

$$C_nF_{2n+1}-O-CF=CF_2$$

wherein $n$ is a number of 1-5, said copolymer containing at least 30 mole percent of units from said ether,
    (B) about 68-99.8% of a solvent for component (A) selected from the group:
        (B-1) mixed isomers of perfluoro cyclic ethers of the empirical formula $C_8F_{16}O$,
        (B-2) non-cyclic fluorinated polyethers of the structure

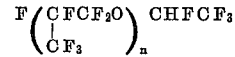

wherein $n$ is a number of 1-5, and
        (B-3) dichlorooctafluorobutane, and
    (C) about 0.1-3% of a viscosity-depressing polar organic compound having a melting point below 75° C., and having a molecular weight below 400;
said percentage values being percent by weight based on the combined weight of components (A), (B), and (C).

2. A composition according to claim 1 wherein the component (A) content is about 5-30%.

3. A composition according to claim 2 wherein component (C) is composed of at least one compound selected from the group: carboxylic acids, anhydrides, hydroxylic compounds, ethers, esters, aldehydes, ketones, amines, amides, nitriles, nitro compounds, sulfones, sulfoxides, phosphines, and phosphates.

4. A composition according to claim 3 wherein component (C) is soluble in component (B) when in combination with components (A) and (B) in an amount within the proportions specified.

5. A composition according to claim 1 wherein said ether of component (A) is perfluoromethyl perfluorovinyl ether.

6. A composition according to claim 1 wherein component (A) is an elastomer having a tetrafluoroethylene/ether molar ratio of about 50:50 to 70:30.

7. A composition according to claim 3 wherein component (C) is trifluoroacetic acid.

8. A composition according to claim 1 wherein component (C) is methanol.

9. A composition according to claim 3 wherein component (C) is hexafluoroisopropanol.

10. A composition according to claim 3 wherein component (C) is diethylene glycol dimethyl ether.

References Cited
UNITED STATES PATENTS

| | | | |
|---|---|---|---|
| 3,546,186 | 12/1970 | Gladding | 260—80.73 |
| 3,132,123 | 4/1964 | Harris | 260—87.5 |
| 3,441,531 | 4/1969 | Koblitz | 260—29.1 |

MORRIS LIEBMAN, Primary Examiner

R. ZAITLEN, Assistant Examiner

U.S. Cl. X.R.

260—31.2 R, 31.8 R, 30.6 R, 32.6 R, 32.8 R, 33.2 R, 33.4 F, 33.6 F, 33.8 F